United States Patent [19]
Stephenson

[11] Patent Number: 6,016,157
[45] Date of Patent: Jan. 18, 2000

[54] PRINTER USING MULTIPLE LIGHT SOURCES AND MONOCHROME LCD

[75] Inventor: Stanley W. Stephenson, Spencerport, N.Y.

[73] Assignee: Eastman Kodak Company, Rochester, N.Y.

[21] Appl. No.: 08/909,985

[22] Filed: Aug. 12, 1997

[51] Int. Cl.$^7$ .................................................. G03B 29/00
[52] U.S. Cl. .................. 347/239; 347/255; 396/429; 396/30; 358/906; 358/909.1
[58] Field of Search .................. 347/232, 239, 347/255; 345/87, 88; 358/501, 906, 909.1; 362/27, 29; 396/429, 30

[56] References Cited

U.S. PATENT DOCUMENTS

| | | | |
|---|---|---|---|
| 4,768,050 | 8/1988 | Beery | 396/583 |
| 4,811,089 | 3/1989 | Kiser et al. | 358/517 |
| 4,843,381 | 6/1989 | Baron | 345/88 |
| 4,935,820 | 6/1990 | Patel et al. | 358/302 |
| 5,032,911 | 7/1991 | Takimoto | 358/501 |
| 5,049,902 | 9/1991 | Duke | 347/172 |
| 5,122,432 | 6/1992 | Hammann, IV et al. | 430/138 |
| 5,143,433 | 9/1992 | Farrell | 362/29 |
| 5,337,068 | 8/1994 | Stewart et al. | 345/88 |

*Primary Examiner*—N. Le
*Assistant Examiner*—Hai C. Pham
*Attorney, Agent, or Firm*—Raymond L. Owens

[57] ABSTRACT

A liquid crystal device for use in sequentially producing an image composed of three separable color plane images including a light diffuser including a sheet of material having a front face and least three sides and which, when light passes through the sides into the diffuser, causes uniform illumination to be produced from the front face and a liquid crystal display disposed in relationship to the front face of the diffuser to receive light from such front face and responsive to electrical signals corresponding to an image to be produced and light from the diffuser to illuminate an image on the liquid crystal display. Three separate sources of colored light disposed in relationship to three sides of the diffuser and arranged to sequentially illuminate the LCD, and means for sequentially producing electrical signals corresponding to separate color planes of the image and the sequential illumination of the three separate colored light sources to sequentially produce an image composed of three separable color plane images.

5 Claims, 3 Drawing Sheets

PRINTER USING MULTIPLE LIGHT SOURCES AND MONOCHROME LCD

FIELD OF THE INVENTION

The present invention relates to the printing of images produced from liquid crystal displays. More specifically, the present invention relates to illumination of liquid crystal displays in portable printing systems.

BACKGROUND OF THE INVENTION

It is known in the prior art to print on light sensitive media using a liquid crystal display as a shutter. Typically, the image bearing surface of a liquid crystal display (LCD) is optically focused onto a sheet bearing a light sensitive emulsion. A source of light is provided behind the LCD to illuminate an image on the surface of the LCD. When color images are being produced, the media supports 3 types of color-sensitive chemistries that form the color image. Prior art discloses the use of a display to create color images using a monochrome LCD and various colors of light. The monochrome LCD is sequentially loaded with separated color planes of a source image, and the corresponding light is used to illuminate a color printing media.

U.S. Pat. No. 4,811,089 discloses the use of a linear electrostatic head or ink jet head to write separate color records to masks. Red, green and blue light sources are then used to illuminate each of the three color masks to expose color-sensitive media.

U.S. Pat. No. 4,935,820 uses a white light source to illuminate a LCD. The LCD carries color separate information, and a dichroic mirror is used to provide the appropriate light color for each separation. Because the dichroic mirror absorbs the other two unused portions of the white light, the system is energy inefficient. U.S. Pat. No. 4,935,820 is used to expose media with very low light sensitivity, which is stated as " . . . in the range of 103 ergs/c$^2$ to 107 ergs/cm$^2$." Such a media requires a very high output light source such as " . . . a 220 watt Tin Halide Arc Lamp type SN 220 manufactured by Phillips." In addition, the LCD should be a highly efficient source of light images.

In commonly assigned U.S. patent application Ser. No. 08/703,289 filed Aug. 26, 1996 to McIntyre et al, there is disclosed apparatus for using a color LCD on the back of electronic cameras to write images to light sensitive media. Such displays have separate pixels for each color. Creating an image on a digital display using separate color elements creates images inferior to images having all three colors of light emitted from common pixels. U.S. Pat. No. 5,337,068 discloses the use of a monochrome LCD, and a multiple sets of red, green and blue lamps to create color images on the monochrome display. Separate color information is written to multiple areas simultaneously at a rapid rate to project all three colors through common pixels. Appropriate lamps are activated simultaneously in separate areas as data are written to each area. Multiple lamps are required for each color of the separate areas and multiple lamps are energized simultaneously during display.

Prior art uses large, high power illumination systems to write separated color images to light sensitive media using liquid crystal displays. It would be useful to create a simple, low-cost, small, low-energy illuminations system to print images without color filter array artifacts. Such a printer could be battery powered and portable.

SUMMARY OF THE INVENTION

It is an object of the present invention to create a small, light portable printer of digital images. It is a further purpose of this invention to make use of an electronic image display in an electronic camera to write directly onto light sensitive media which can effectively provide a hard copy. Furthermore, the illumination sources needs uses separate light sources that use illuminant power to efficiently produce single colors in a small package size.

This object is achieved by a liquid crystal device for use in sequentially producing an image composed of three separable color plane images, comprising:

(a) a light diffuser including a sheet of material having a front face and least three sides and which, when light passes through the sides into the diffuser, causes uniform illumination to be produced from the front face;

(b) a liquid crystal display disposed in relationship to the front face of the diffuser to receive light from such front face and responsive to electrical signals corresponding to an image to be produced and light from the diffuser to illuminate an image on the liquid crystal display;

(c) three separate sources of colored light disposed in relationship to three sides of the diffuser and arranged to sequentially illuminate the LCD; and (d) means for sequentially producing electrical signals corresponding to separate color planes of the image and the sequential illumination of the three separate colored light sources to sequentially produce an image composed of three separable color plane images.

ADVANTAGES

A feature of this invention is that a small portable printer can use a monochrome LCD to write three separate color planes onto to a light sensitive sheet. The monochrome display writes all three colors through each pixel to create an image without separately colored pixels appearing on the print. A small printer is created by using three small lamps illuminating a common diffuser behind the LCD. Three separate color lamps, each dedicated to providing a single color and energized at separate times provides energy efficient illumination.

DETAILED DESCRIPTION OF THE INVENTION

Figure 1:
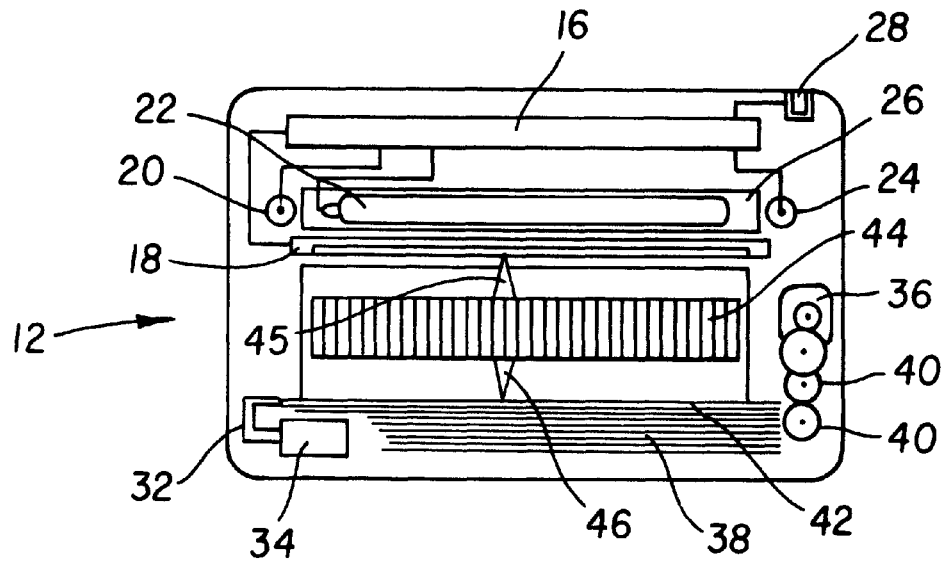
FIG. 1 is a top sectional view of an electronic printer in accordance with the present invention.

The invention is directed to a compact printer used in conjunction with electronic cameras. Such a printer must be small, light and energy efficient to provide portability. Turning now to FIG. 1, a top sectional view of the printer 12 is shown. The operation of printer 12 is controlled by printer electronics 16. Printer link 28 provides for communication to other apparatus, such as an electronic camera that stores digital images. Printer link 28 can be a two-connection serial port, an infrared sensor or other standard communication interfaces. An image, formed of three separable color planes, is received, processed, and printed by printer electronics 16.

Figure 2:
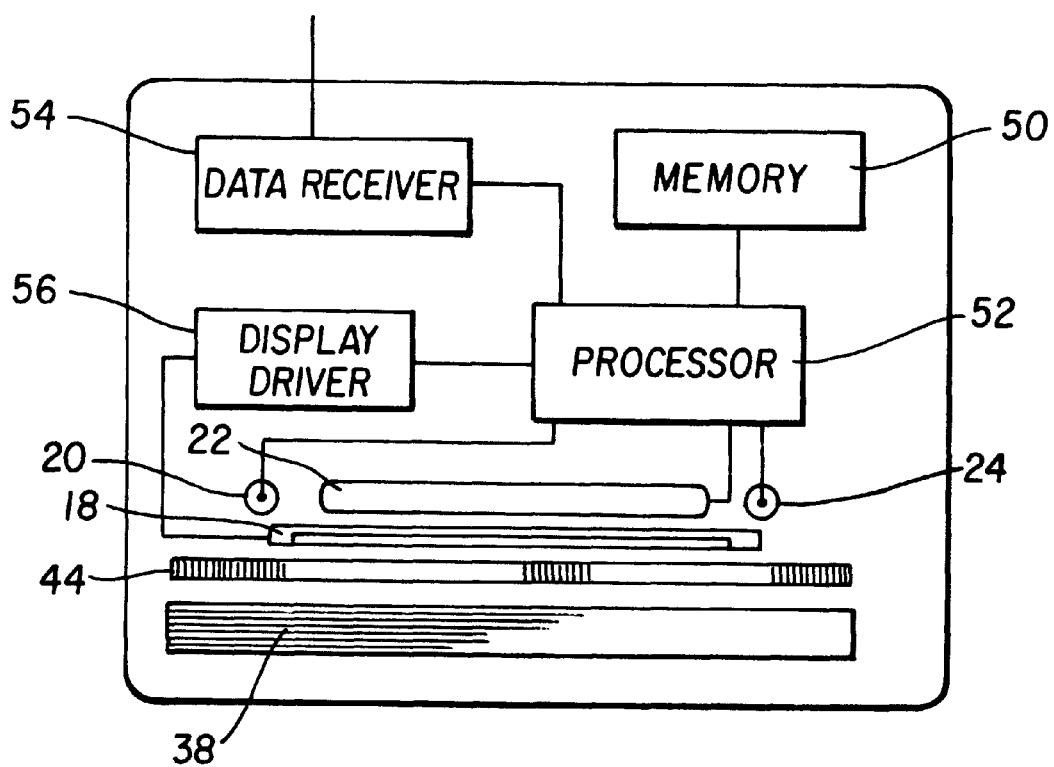
FIG. 2 is an electrical schematic of the printer in accordance with the present invention.

FIG. 2 is an electrical schematic of part of printer electronics 16 and shows the transfer of an image from a digital record to a print. Data is received by data receiver 54, and is operated on by processor 52. Processor 52 stores a received image in memory 50. Processor 52 can transmit the image in memory 50 through display driver 56 to LCD 18.

LCD 18 is a monochrome display such as Sharp Corp. model LM64P101. Display 18 has 640 horizontal square pixels in 480 vertical lines on 0.23 millimeter spacing to form a display having a 7.43 inch diagonal. This LCD display is currently used to display black and white data. In the present invention, data are loaded in parallel units of 8 bits that represent on and off conditions for each pixel. The display is written in 38,400 8 bit words in 11.7 milliseconds update. Data are written to the display by a method called out in copending U.S. patent application Ser. No. 08/824,694 filed Apr. 8, 1997 to Stephenson. Data for a given color plane image are written in 256 updates, each update representing an increased exposure time. At the end of the 256 updates, a continuous tone color plane image will be written from the source image data. The printing process is done for each of the red, green, and blue color plane images to produce a full color image.

Figure 5:
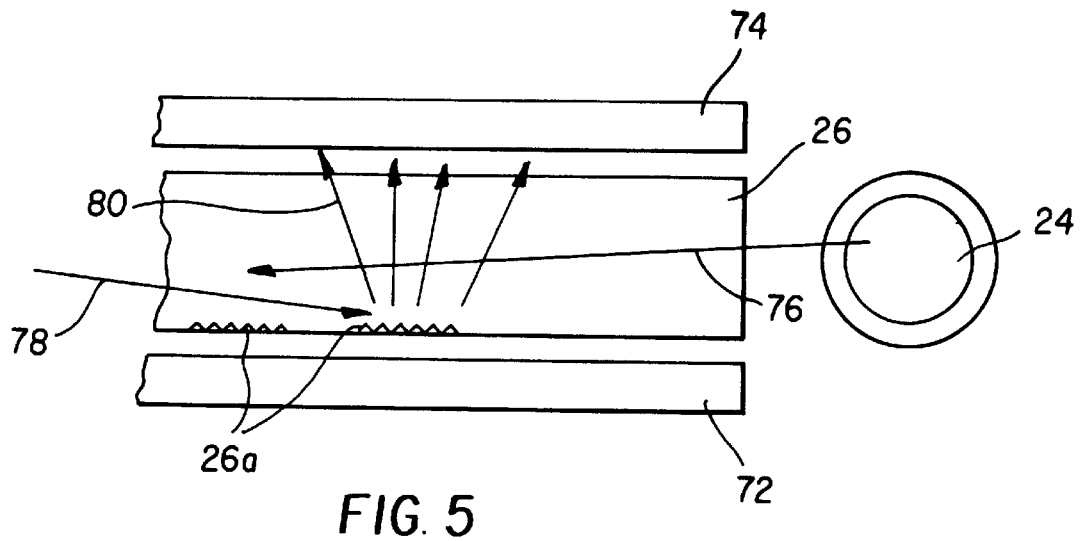
FIG. 5 is a top view of the illumination system of the printer in FIG. 1.

During the writing process, LCD display 18 is illuminated by one of three separate color light sources shown as red fluorescent lamp 20, green fluorescent lamp 22, and blue fluorescent lamp 24 which are disposed around a transparent integrating bar 26 which acts as a diffuser. FIG. 5 is a sectional view of the illumination system. The integrating bar 26 (diffuser) causes uniform illumination of the liquid crystal display. The fluorescent lamps are disposed in relationship to three sides of a diffuser and are individually and sequentially actuated by processor 52 for each color plane image. Blue fluorescent lamp 24 produces emitted light 76. Emitted light 76 enters integrating bar 26. Integrating bar 26 is composed of a clear, light transmitting material such as transparent acrylic and has optically smooth faces to reflect incident light. An array of emission areas 26a is disposed on the surface of integrating bar 26 that is furthest away from LCD display 18. Emission areas 26a are roughened surfaces that trap striking light 78 and re-emit striking 78 as illuminating light 80. Emission areas 26a act as an array of micro-emitting lamps that generate a uniform illumination field across LCD display 18. Back reflector 72 is disposed behind integrating bar 26 and redirects stray light back into integrating bar 26. Back reflector 72 can be, for instance, a plastic member containing a high concentration of titanium dioxide to create a highly reflective surface to integrating bar 26. Alternatively, the surfaces of back reflector 72 facing integrating bar 26 can have an metallic, reflective coating to re-direct light back into integrating bar 26. Back reflector 72 can also wrap up and around fluorescent lamps 20, 22 and 24 to provide an enclosing surface that reflects light from the lamps back into integrating bar 26. A front diffuser 74 can be placed between integrating bar 26 and LCD display 18 to improve light uniformity.

Figure 3:
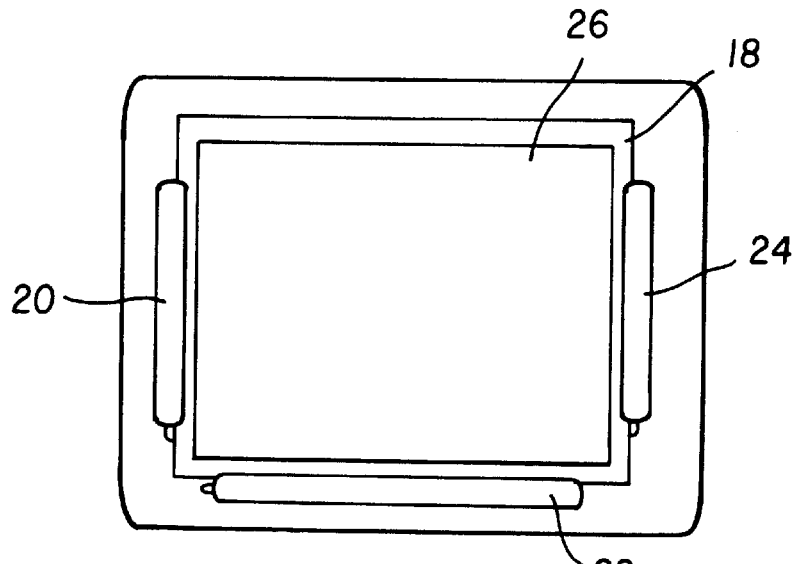
FIG. 3 is a front sectional view showing portions of the printer in FIG. 1.
Figure 6:
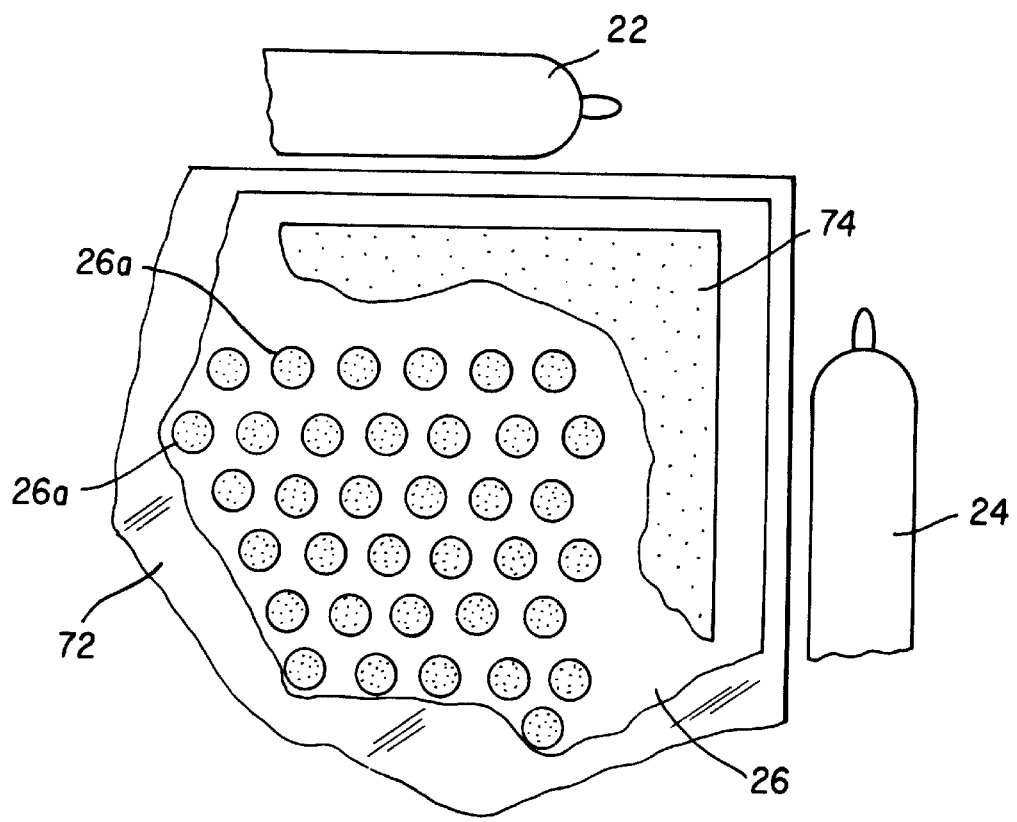
FIG. 6 is a front view, partially in section, of the illumination system in FIG. 5.

Turning now to FIG. 6, the emission areas 26a are formed in round disks with uniform roughness that act as light emitters for light impinging from any direction. This structure for emission areas 26a permits one integrating bar to be used for all three lamps 20, 22, and 24 if the lamps are disposed around three of the sides of integrating bar 26 as shown in FIG. 3. Each lamp is oriented to emit it's specific color of light into integrating bar 26.

Fluorescent lamps 20, 22, and 24 are conventional fluorescent lamps using an ultra-violet (254 nm) glow discharge from an excited mercury vapor. Phosphor coatings on the inside of the lamps support phosphors that emit in one of the three primary colors red, green and blue. Lamp 20 emits red fluorescent light and can be Harison lamp HMB4-150B, doped with the "R" phosphor. Such a lamp is 4.1 mm in diameter, 150 mm long and emits 8000 candela/m$^2$. Lamp 22 has the same part number and dimensions but is coated with "G" phosphors to emit green light Similarly, lamp 24 is the same mechanical package and part number, but coated with the "B" phosphor to emit blue light.

Using phosphors dedicated to a single color in each lamp permits the energy delivered to a lamp to be concentrated on the emission of the single color required for a given color plane of the image. Using multiple lamps for each color as in U.S. Pat. No. 5,337,068 requires many more lamps, and more energy will be used than using a unitary lamp for each color. If one or more white light lamps are used, ⅔ of the energy is wasted by filtering out the other 2 colors. Energizing three separate lamps at separate times for each of three separate color plane images reduces power requirements and provides sufficient illumination to permit the development of a portable, battery powered printers.

Figure 4:
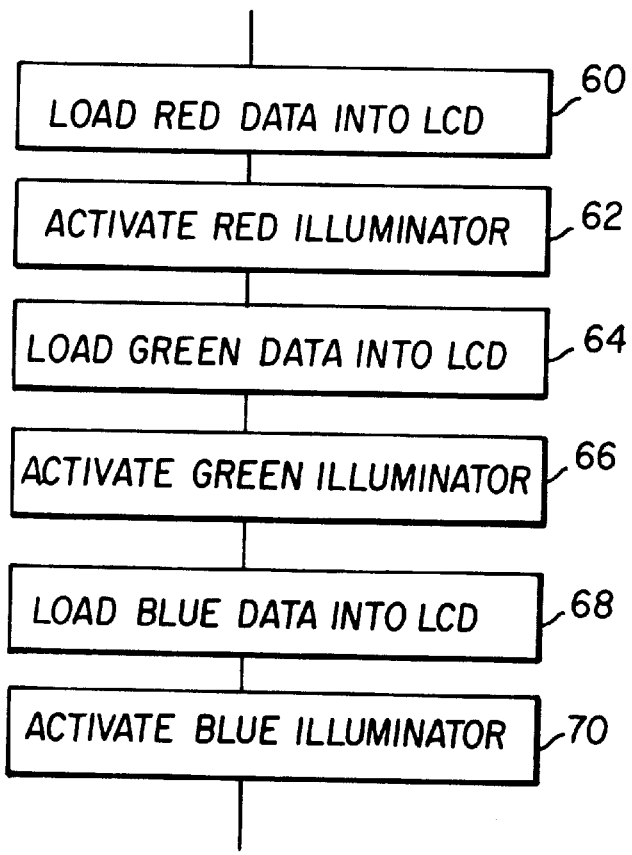
FIG. 4 is a flow chart of the operation of the printer in FIG. 1.

FIG. 4 is a flow chart of the process that is used to create a print according to the present invention. In step one, 60, processor 52 turns on red fluorescent lamp 20. In step two, 62, processor 52 writes the red image data to liquid crystal display 18 from memory 50. In step three, 64, processor switches illumination power to green fluorescent lamp 22. In step four, 66, processor loads the green image data into liquid crystal display 18 from memory 50. In step 5, 68, processor 52 switches illumination power to blue fluorescent lamp 24. In step six, 70, processor 52 writes the blue image data to liquid crystal display 18. The sequential illumination for specific colors reduces peak power demand on the printer. Processor 52 writes the color plane image associated with the illuminant color to liquid crystal display 18.

Printer 12 contains a stack of photosensitive sheets 38 to receive the image illuminated on LCD display 18. These sheets are light sensitive and are loaded into the camera and stored in light sensitive manner as is known in the art. Photosensitive sheets 38 can be found in current art as instant silver-halide sheets or pressure sensitive microencapsulated crushable color particles such as disclosed in U.S. Pat. No. 4,768,050; 5,049,902; and 5,122,432. Alternatively, images can be stored on photographic film and then stored and chemically processed at a later time.

Printing optic 44 is disposed between LCD display 18 and the top media sheet 42. Printing optic 44 focuses a display area from the camera display 18 onto a photosensitive surface of the sheet. Printing optic 44 can be formed from Nippon Sheet Glass rod lens array type 20B which has a total conjugate 15.1 mm. The actual element is 6.89 mm tall and first working distance 45 and second working distance 46 are 4.10 mm.

The top photosensitive sheet 42 is transported into image receiving relationship with the LCD where it is exposed with three separate image color planes. After this exposure process, the exposed top photosensitive sheet 42 is urged by picker 32 using picker drive 34 into processing rollers 40 under the control of printer electronics 16. Processing rollers 40 are driven by roller drive 36 under control of printer electronics 16 and receive urged photosensitive sheet 42. Processing rollers 40 or other means are used to apply pressure to photosensitive sheet 42 to process and stabilize the latent image on the surface of photosensitive sheet 42.

In the case of silver halide imaging, a pod of chemicals at the leading edge of photosensitive sheet 40 is burst by processing rollers 40. The chemicals are spread across the image of photosensitive sheet 42 as photosensitive sheet 42 passes through processing rollers 40. The chemicals operate on the latent image to create a permanent colored dye image on photosensitive sheet 42. In the case of crushable media, the rollers apply pressure to micro-beads containing the latent image. Burst micro-beads release dye chemistries onto photosensitive sheet 42 to create a permanent color image.

The invention has been described in detail with particular reference to certain preferred embodiments thereof, but it will be understood that variations and modifications can be effected within the spirit and scope of the invention.

Parts List

12 printer
16 printer electronics
18 LCD display
20 red fluorescent lamp
22 green fluorescent lamp
24 blue fluorescent lamp
26 transparent integrating bar
26a emission areas
28 printer link
32 picker
34 picker drive
36 roller drive
38 media sheets
40 processing rollers
42 photosensitive sheet
44 printing optic
45 first working distance
46 second working distance
50 memory
52 processor
54 data receiver
56 display driver
60 step one
62 step two
64 step three
66 step four
68 step five
70 step six
72 back reflector
74 front diffuser
76 emitted light
78 striking light
80 illuminating light

What is claimed is:

1. A liquid crystal device for use in sequentially producing an image composed of three separable color plane images, comprising:

(a) a light diffuser including a sheet of material having a front face and least three sides and which, when light passes through the sides into the diffuser, causes uniform illumination to be produced from the front face;

(b) a liquid crystal display LCD disposed in relationship to the front face of the diffuser to receive light from such front face and responsive to electrical signals corresponding to the image to be produced and light from the diffuser to illuminate the image on the liquid crystal display;

(c) three separate sources of colored light disposed in relationship so that each separate light source corresponds to a different one of the three sides of the diffuser and arranged to sequentially illuminate the LCD; and (d) means for sequentially producing electrical signals corresponding to separate color planes of the image and the sequential illumination of the three separate colored light sources to sequentially produce the image composed of three separable color plane images.

2. A printer which uses a liquid crystal display for sequentially producing an image captured by photosensitive medium and composed of three separable color plane images, comprising:

(a) a light diffuser including a sheet of material having a front face and at least three sides and which, when light passes through the sides into the diffuser, causes uniform illumination to be produced from the front face;

(b) a liquid crystal display LCD disposed in relationship to the front face of the diffuser such that the diffuser causes uniform illumination to be produced on the display and having a plurality of pixels which are responsive to electrical signals corresponding to the image to be produced and light from the diffuser to illuminate the image on the liquid crystal display;

(c) three separate sources of colored light disposed in relationship so that each separate light source corresponds to a different one of the three sides of the diffuser and arranged to sequentially illuminate the LCD;

(d) means for sequentially producing electrical signals corresponding to separate color planes of the image and the sequential illumination of the three separate colored light sources to sequentially produce the image composed of three separable color plane images; and (e) means for transporting a photosensitive medium into transferable relationship with the LCD for producing the image on the photosensitive medium.

3. The printer according to claim 2 further including optical means for focusing the three separable color plane images onto the photosensitive medium.

4. The printer according to claim 3 wherein the same pixels on the display are used to produce each of the image plane images.

5. The printer according to claim 3 wherein the diffuser includes an integrating bar.

* * * * *